March 15, 1927. 1,620,809
A. H. FAGER
VEHICLE RUNNING GEAR
Filed July 7, 1926 2 Sheets-Sheet 1
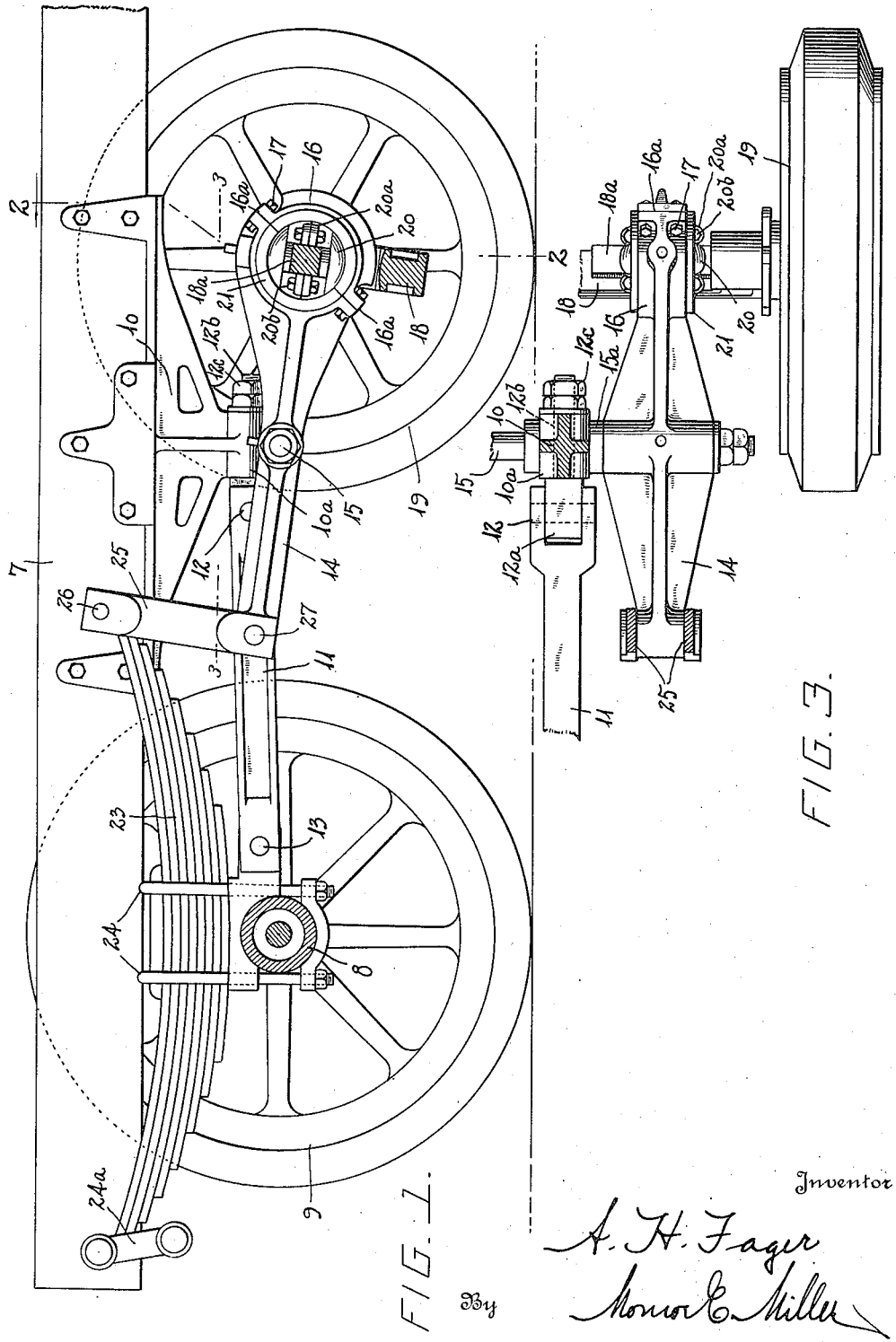

March 15, 1927.
A. H. FAGER
1,620,809
VEHICLE RUNNING GEAR
Filed July 7, 1926
2 Sheets-Sheet 2
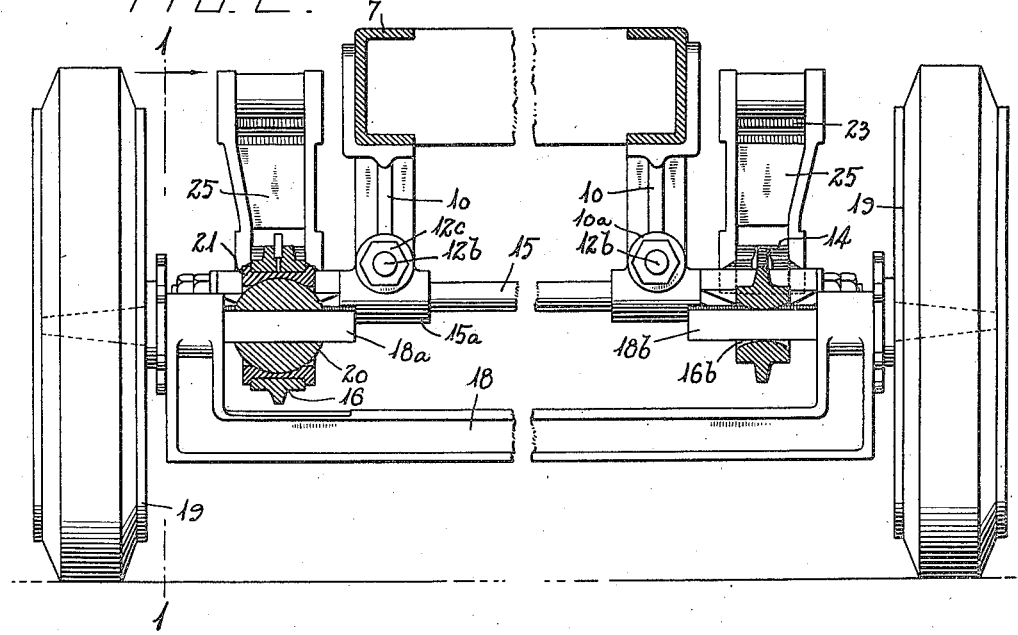
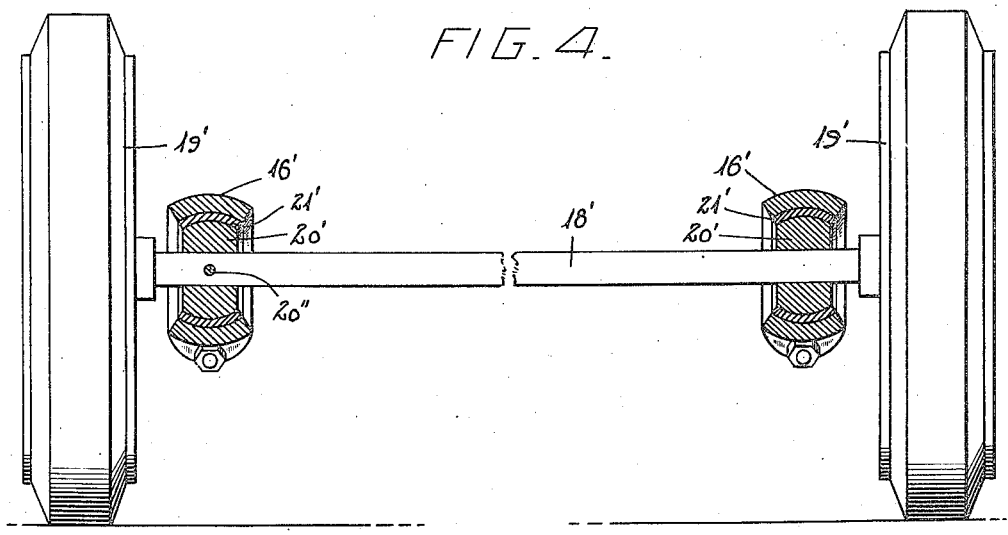
Inventor:
A. H. Fager
By Monroe E. Miller
Attorney.

Patented Mar. 15, 1927.

1,620,809

UNITED STATES PATENT OFFICE.

ALBERT H. FAGER, OF LOS ANGELES, CALIFORNIA.

VEHICLE RUNNING GEAR.

Application filed July 7, 1926. Serial No. 121,039.

The present invention relates to vehicle running gear, and this application is a continuation in part of application Serial No. 75,394, filed Dec. 14, 1925.

One object of the invention is to provide novel means for attaching a pair of extra wheels to a motor truck or other vehicle.

Another object is to provide a novel compensating connection of the extra or additional wheels with the frame and wheel axle (preferably the rear axle) of the chassis, to provide for a compensating action due to changes of wheel loads when passing over irregularities in the surface of a road.

A further object is to provide a suitable connection between two pairs of wheels and the frame, enabling either pair of wheels to move upwardly and downwardly relatively to the frame, but distributing the stresses and strains between the two pairs of wheels.

A still further object is the provision of means for connecting an extra pair of wheels to the frame and wheel axle of a motor truck chassis or other vehicle, to permit either pair of connected wheels to move upwardly and downwardly relatively to the frame, but transmitting the greater part of the load to the regular wheels of the chassis.

Still another object is the provision of novel means for connecting a wheel axle with levers or other members connected with the vehicle frame for upward and downward movement, whereby the axle may oscillate as well as move upwardly and downwardly when passing over uneven surfaces.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

The invention is illustrated in the accompanying drawings, wherein—

Figure 1 is a side elevation of the improved structure, with the near wheels removed and the axles shown in section on the line 1—1 of Fig. 2.

Fig. 2 is a transverse section on the line 2—2 of Fig. 1, portions being shown in elevation.

Fig. 3 is a section on the line 3—3 of Fig. 1.

Fig. 4 is a sectional detail of a modification, showing the wheels and axle in elevation.

Only a portion of a motor truck chassis is shown in the drawings, including the frame 7 and rear axle housing 8, the attachment being applied to the rear axle of the truck as shown, and the rear axle has a wheel 9 at each end, as usual.

In applying the attachment to the chassis, a depending bracket or rigid hanger 10 is suitably secured to the frame 7 at each side thereof in front of the rear axle housing 8, and a radius bar 11 is pivoted, at its rear end, as at 13, to the axle housing 8, and has its forward end bifurcated and pivoted, as at 12, to the head $12^a$ of a pintle $12^b$ mounted for rotation within a longitudinal bearing $10^a$ of the bracket 10, with nuts $12^c$ on the forward terminal of the pintle $12^b$ to hold said pintle in place. The pintle $12^b$ may rotate in the bearing $10^a$, and with the pivot 12, provides a universal joint connection between the radius bar 11 and bracket 10, permitting the rear axle to move upwardly and downwardly and oscillate.

A lever or rocket member 14 is disposed at each side of the chassis, at the outer side of the corresponding bracket 10, and said levers are mounted between their ends on a transverse rod or shaft 15 extending through transverse bearings $15^a$ of the brackets 10 immediately below the bearings $10^a$. Said levers or members 14 may thus oscillate about the transverse axis of the rod or shaft 15. The forward arm of one lever 14 has a band or ring 16, which is split, as at $16^a$, with outstanding ears at the adjacent ends of the sections secured together by means of bolts 17 or otherwise, while the forward arm of the other lever 14 is formed with an aperture $16^b$ whose upper and lower walls are convexed, as seen in Fig. 2.

The attachment includes an extra axle 18, which is a dropped axle as shown, and the extra pair of wheels 19 are mounted for rotation on the usual spindles with which the ends of the axle 18 are formed. The axle 18 is dropped between the wheels 19, as seen in Fig. 2, and the axle is provided with the stubs or portions $18^a$ and $18^b$ extending inwardly from the end portions of the axle in alinement with the spindles.

The stub $18^a$ is connected with the lever 14 which has the band 16 for oscillatory motion, while the stub $18^b$ is connected to the lever 14 which has the aperture 16$^b$ for sliding and oscillatory motion, to permit the axle 18 to oscillate even though the levers 14 move in longitudinal vertical planes. Thus, the stub 18$^b$, which is of square or angular cross-section extends slidably through the aperture 16$^b$ which is of similar cross-section, so that the axle 18 is prevented from turning, and the stub 18$^b$ may slide and oscillate in the aperture 16$^b$. A ball member 20 is secured on the stub 18$^a$, being split diametrically and the sections thereof having ears 20$^a$ secured together, as at 20$^b$, by bolts or other securing elements. Thus, the ball member 20 is readily clamped on the stub 18$^a$. A liner or bushing 21 is clamped within the band 16, and is also preferably split similar to the band, and the ball member 20 is fitted for oscillation within the bushing or liner 21, the periphery of the member 20 and inner periphery of the bushing 21 being spherical to permit the member 20 to turn freely within the bushing. Thus, the axle 18 is secured to the member 20 which may oscillate relatively to the corresponding lever 14, and the stub 18$^b$ may also oscillate or rock in the aperture 16$^b$ as well as slide therein, which will permit the axle 18 to rock transversely of the truck or vehicle, due to the wheels 19 at the opposite sides passing over irregularities in the surface of the road. The ball member 20 and bushing 21 provide a ball and socket or universal joint connection between the axle 18 and corresponding lever 14, permitting of freedom or flexibility of motion, in addition to the sliding and rocking motion of the stub 18$^b$ in the aperture 16$^b$, and the non-rotatability of the stub 18$^b$ in said aperture will maintain the axle 18 in depending position, to prevent the axle rotating around its axis.

The axle housing 8 and axle 18 are connected for the transmission of strains and stresses from one to the other. As shown, the usual or customary semi-elliptical laminated leaf springs 23 are secured by suitable clamps 24 on the axle housing 8 for supporting the frame 7 yieldably on said axle housing, the rear ends of the springs 23 being connected by shackles 24$^a$ with the rear end portion of the frame 7 in any well known manner. The forward ends of the springs 23 are connected by links 25 with the rear arms of the levers 14, the upper ends of the links being pivotally connected, as at 26, with the forward ends of the springs, and the lower ends of the links being pivotally connected, as at 27, with the rear ends of the levers 14.

In the arrangement shown and described, part of the weight of the load is transmitted from the frame 7 to the rear ends of the springs 23 and thence to the rear axle, and part of the weight is transmitted by the brackets 10 to the levers 14 from which it is distributed to the rear axle and additional axle 18. When a stress or strain occurs, tending to move the axle 8 and frame 7 toward one another, there is a tendency to move the levers 14 downwardly and the springs 23 upwardly relatively to one another, the levers 14 being swung downwardly on the axis of the axle 18, whereby the downward pull on the links 25 will flex or bend the forward portions of the springs 23. The same action occurs when the wheels 19 pass over an obstruction, inasmuch as the levers 14 are swung (counter clock-wise as seen in Fig. 1) to pull the links 25 and forward terminals of the springs 23 downwardly, thereby imposing greater pressure on the rear axle 8. When the frame 7 and axle 8 move toward one another, such as when the wheels 9 pass over an obstruction, there is a tendency for the springs 23 to raise the links 25, thereby swinging the rear arms of the levers 14 upwardly and imposing greater pressure on the axle 18, the springs 23 yielding to distribute the stresses and strains between the two axles and pairs of wheels.

Fig. 4 shows a modification in that both levers have the bands 16' in which ball members 20' are mounted for oscillation, with the axle 18' extending through said members 20'. Liners or bushings 21' are disposed within the bands 16' and the outer peripheries of the members 20' and inner peripheries of the bushings 21' are spherical to permit the members 20' to oscillate in the bushings. The axle 18' and one member 20' are secured together, as at 20'', to prevent the axle sliding in said member, but the axle 8 is slidable through the other member 20', in order that the axle may oscillate transversely when the wheels 19' pass over uneven surfaces, it being understood that the bands 16' and members 20' move upwardly and downwardly in longitudinal vertical planes.

With either form, one wheel of the extra pair may move in a hole or rut in a road or over a hump or obstruction while the other wheel moves on a level surface, or one wheel may move into a rut or hole while the other wheel moves over a hump or obstruction, inasmuch as the axle of the extra pairs of wheels is free to oscillate transversely as well as move upwardly and downwardly. Thus, the axle has an oscillatory or rocking connection with one lever or member 14 and has a sliding and oscillatory or rocking connection with the other lever, permitting the axle to oscillate when the levers or members 14 move upwardly and downwardly relatively to one another.

Having thus described the invention, what is claimed as new is:—

1. The combination of a vehicle frame, members at opposite sides connected with the frame for upward and downward movement, and a wheel axle having an oscillatory connection with one of said members and an oscillatory and sliding connection with the other member.

2. The combination of a vehicle frame, levers at opposite sides connected with the frame for upward and downward swinging movement about a transverse axis, and a wheel axle having an oscillatory connection with one lever and having an oscillatory and sliding connection with the other lever.

3. The combination of a vehicle frame, members at opposite sides connected with the frame for upward and downward movement, an axle having an oscillatory and sliding connection with one of said members, and a ball member secured to said axle and mounted for oscillatory movement in the other member.

4. The combination of a vehicle frame, opposite side members connected with the frame for upward and downward movement, one member having an aperture, a ball member mounted for oscillatory movement in the other member, and an axle having a portion extending through said ball member and a portion slidable through said aperture.

5. The combination of a vehicle frame, levers at opposite sides connected with said frame for upward and downward swinging movement about a transverse axis, one lever having an aperture, a ball member mounted in the other lever for rotary movement therein, and an axle having a portion extending through said ball member and a portion extending through said aperture, the last named portion being adapted to slide and oscillate in said aperture.

6. The combination with a vehicle frame, of members at opposite sides connected with the frame for upward and downward movement, a pair of wheels, an axle for said wheels and dropped between said wheels, said axle having inwardly extending stubs at its ends with one stub having an oscillatory connection with the corresponding member and the other stub having an oscillatory and sliding connection with the other member.

7. The combination with a vehicle frame, of members at opposite sides connected with the frame for upward and downward movement, one member having an aperture of angular form, a ball member mounted in the other member for oscillatory movement, a pair of wheels, an axle for said wheels dropped between said wheels, the axle having inwardly extending stubs at its ends, one stub extending through and being secured to said ball member, and the other stub being of angular cross-section and extending through said aperture for sliding and oscillatory movements therein.

8. The combination with a vehicle comprising a frame, an axle with wheels thereon, and leaf springs supported by the axle and supporting said frame, of an extra axle with wheels thereon, levers pivotally connected with said frame, said extra axle having oscillatory and sliding connections with said levers, and means connecting said levers and leaf springs.

9. The combination with a vehicle comprising a frame, an axle with wheels thereon, and leaf springs mounted between their ends on said axle and supporting the frame at one end of the springs, of an extra axle with wheels thereon, levers pivotally connected between their ends with the frame, one arm of each lever being connected with the extra axle for the oscillatory and sliding movements of said extra axle relatively to said levers, and links connecting the other arms of said levers and the other ends of said springs.

10. The combination with a vehicle comprising a frame, an axle with wheels thereon and leaf springs supported by said axle and supporting said frame, of an extra axle with wheels thereon, brackets attached to said frame, levers fulcrumed to said brackets and connected with said extra axle for the oscillatory motion of said axle relatively to said levers, radius bars connected to the first named axle and said brackets, and means connecting said levers and springs.

11. The combination with a vehicle comprising a frame, an axle with wheels thereon and leaf springs mounted between their ends on said axle and connected at one end with said frame, of an extra axle with wheels thereon, brackets secured to said frame between said axles, levers fulcrumed to said brackets between the ends of the levers, one arm of each lever being connected with the extra axle for the oscillatory motion of said axle relatively to said levers, links connecting the other arms of said levers and the other ends of said springs, and radius bars connecting the first named axle and brackets.

In testimony whereof I hereunto affix my signature.

ALBERT H. FAGER.